Jan. 12, 1926.  1,569,384
R. E. MARBURY
CONDENSER
Filed August 3, 1921

WITNESSES:
A. G. Schiefelbein
W. B. Jaspert.

INVENTOR
Ralph E. Marbury.
BY
Wesley G. Carr
ATTORNEY

Patented Jan. 12, 1926.

1,569,384

UNITED STATES PATENT OFFICE.

RALPH E. MARBURY, OF WILKINSBURG, PENNSYLVANIA, ASSIGNOR TO WESTINGHOUSE ELECTRIC & MANUFACTURING COMPANY, A CORPORATION OF PENNSYLVANIA.

CONDENSER.

Application filed August 3, 1921. Serial No. 489,540.

*To all whom it may concern:*

Be it known that I, RALPH E. MARBURY, a citizen of the United States, and a resident of Wilkinsburg, in the county of Allegheny and State of Pennsylvania, have invented a new and useful Improvement in Condensers, of which the following is a specification.

My invention relates to mica condensers of the low-voltage type, more especially to stacked condenser units embodying mica insulation, and it is among the objects thereof to provide condensers which shall be of constant capacity and which shall not change under fluctuating temperature and atmospheric conditions.

It is a further object of my invention to provide a condenser that embodies a relatively inexpensive structure requiring very little machining and which may be readily assembled without employing bolts or screw clamps.

Heretofore, stacked mica condensers have been formed by assembling a plurality of alternate layers of mica and metal foil between metal plates and securing the assembled structure together by screw bolts or similar means. The disadvantages of such structures are the necessity for drilling and tapping screw holes in the plates in alinement with each other and the adjustment of the screw bolts to correct for changes in the capacity of the condenser. Under these conditions, it was practically impossible to obtain constant capacity, which is essential in radio and telephone transmission.

My invention obviates these difficulties by providing a structure in which the condenser elements are contained within a flexible spring support which is self-adjusting and which exerts a constant pressure against the stacked layers under all service conditions.

The condenser is constructed by assembling a plurality of alternate layers of conductor members and dielectric material between outer layers of protective insulation, such as mica, placing a relatively thick plate, usually of steel, on both sides thereof, placing a spring steel plate on each of said steel plates, clamping the assembled members together and securing base and top members having the side edges buckled to provide gripping jaws thereon.

The structure is then released from the clamps which causes the gripping jaws to engage the spring plates, which bend, causing pressure to bear on the steel plates between which the condenser elements are positioned. The terminals of the conductor elements are soldered to terminal leads and the completed condenser may be further provided with a protective casing.

In the accompanying drawings, forming a part hereof and in which like reference characters designate like parts, Figure 1 is a side elevational view of a condenser made in accordance with my invention;

Figure 1:
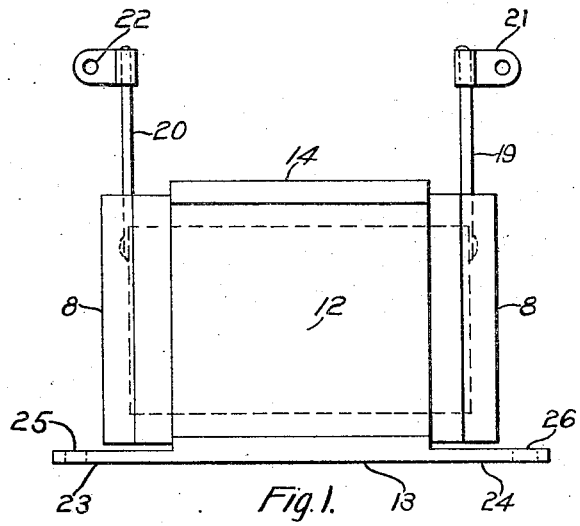
Figure 2:
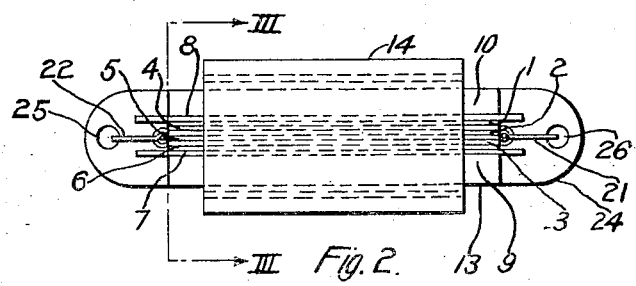
Fig. 2 is a plan view thereof.
Figure 3:
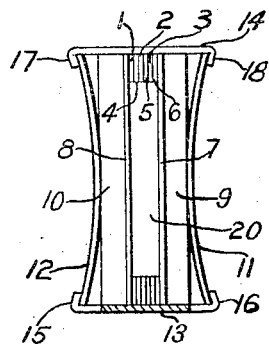
Fig. 3 is an end view, partially in cross section, taken along the lines III—III of Fig. 2.

A plurality of alternate layers of metal foil 1, 2, 3 etc., and sheets 4, 5, 6 etc., of dielectric material, such as mica, are stacked in the usual manner between two protective insulating sheets 7 and 8 of mica, paper, fiber or equivalent materials. Relatively thick steel plates 9 and 10 are placed on the sheets 7 and 8, respectively, and spring steel pressure plates or bowed leaf springs 11 and 12 are placed on the members 9 and 10, respectively.

A sheet-metal base 13 and top 14, having their side edges 15, 16, 17 and 18 bent inwardly to provide a retaining shoulder, are placed over the assembled plates and secured thereto by first compressing the springs 11 and 12, usually by clamps, and then sliding the base 13 and top 14 into position. The pressure on springs 11 and 12 is released, causing the same to bend inwardly, providing concave sides which press upon the assembled members, to compact the structure.

The extended ends of alternate layers of foil 1, 2 and 3 are soldered to terminals 19 and 20 having contacts 21 and 22, respectively, for connecting the condenser in a circuit. The base 13 is provided with extended ends 23 and 24 having screw holes 25 and 26, respectively, therein for securing the condenser to a support (not shown).

From the above description of my invention it will be readily seen that condensers formed in accordance therewith are simple in construction, may be readily assembled, are self-adjusting to maintain constant capacity and are a decided improvement over prior structures of this kind.

Although I have described a specific embodiment of my invention, it will be obvious to those skilled in the art that various modifications may be made in the structural parts thereof without departing from the principles herein set forth. For instance, the base and top plates may be castings instead of formed sheet metal and the terminals may be placed at the ends instead of at the top of the condenser, as shown. Any suitable dielectric material, such as paper, fiber, mica and the like, may be employed in the condenser body. These and other changes in details of construction may be made within the scope of my invention.

I claim as my invention:

1. An electrical apparatus comprising a stack of superimposed layers, end plates therefor, a bowed leaf spring disposed against at least one of said end plates, said spring having its central portion in engagement with said end plate and its end portions spaced therefrom, and clip members having inwardly disposed retaining shoulders for engaging said end portions to hold said stack together under the yielding pressure of said spring.

2. An electrical condenser comprising a stack of alternate layers of foil and dielectric sheet material, end plates therefor, a bowed leaf spring disposed against each end plate, each spring having its central portion in engagement with an end plate and its end portions spaced therefrom, and clip members having inwardly disposed retaining shoulders for engaging said end portions to hold said stack together under the yielding pressure of said springs.

In testimony whereof, I have hereunto subscribed my name this 25th day of July, 1921.

RALPH E. MARBURY.